United States Patent [19]

Swallow

[11] Patent Number: 6,038,694
[45] Date of Patent: *Mar. 14, 2000

[54] ENCODER FOR PRODUCING A CHECKSUM ASSOCIATED WITH CHANGES TO A FRAME IN ASYNCHRONOUS TRANSFER MODE SYSTEMS

[75] Inventor: George Swallow, Concord, Mass.

[73] Assignee: Cisco Systems, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/823,079

[22] Filed: Mar. 24, 1997

[51] Int. Cl.⁷ .......................... H03M 13/00; G06F 11/10
[52] U.S. Cl. .......................... 714/781; 714/807; 714/808
[58] Field of Search .................... 714/781, 807, 714/808; 370/392, 395, 473

[56] References Cited

U.S. PATENT DOCUMENTS

| | | | |
|---|---|---|---|
| 5,121,397 | 6/1992 | Norrod | 371/54 |
| 5,247,524 | 9/1993 | Callon | 371/53 |
| 5,345,451 | 9/1994 | Uriu et al. | 371/42 |
| 5,383,204 | 1/1995 | Gibbs et al. | 371/37.7 |
| 5,406,550 | 4/1995 | McIiffin | 370/18 |
| 5,528,588 | 6/1996 | Bennett et al. | 370/60 |
| 5,541,918 | 7/1996 | Ganmukhi et al. | 370/60.1 |
| 5,691,997 | 11/1997 | Lackey, Jr. | 371/53 |

*Primary Examiner*—Hoa T. Nguyen
*Attorney, Agent, or Firm*—Cesari and McKenna, LLP

[57] ABSTRACT

An intermediate station produces, for an altered packet that includes multiple cells from a received packet and one or more altered cells that are substituted for the corresponding cells of the received packet, a Δ-CRC remainder that is combined with the CRC remainder included in the received packet to produce a CRC remainder for the altered packet. The station first produces for each altered cell a bit pattern that has zeros in the bit positions in which the bits of the altered cell and the corresponding received cell match and ones in the bit position in which the two cells do not match. The station next encodes the bit patterns in accordance with the CRC code and produces corresponding Δ-CRC values. It then manipulates the Δ-CRC values to produce the Δ-CRC remainder, and combines the Δ-CRC remainder with the CRC remainder in the received packet. The result is the CRC remainder for the altered packet.

17 Claims, 4 Drawing Sheets

ENCODER FOR PRODUCING A CHECKSUM ASSOCIATED WITH CHANGES TO A FRAME IN ASYNCHRONOUS TRANSFER MODE SYSTEMS

FIELD OF THE INVENTION

This invention relates generally to communications systems and, more particularly, to asynchronous transfer mode systems.

BACKGROUND OF THE INVENTION

In asynchronous transfer mode (ATM) systems a source station separates a multiple-byte data packet into a plurality of fixed-length cells. The data packet includes data and typically one or more packet headers which include routing and other information. As used herein, the term "data bytes" refers to both the data and the packet header(s).

Each cell includes a payload of up to 48 data bytes and also contains a 5-byte cell-header that, like the packet header(s), includes routing and other information. Padding is appended to the data bytes, as necessary, to ensure that the payload of each cell is 48 bytes in length. These cells, in turn, are transmitted over a network to a designated destination station.

As the packets are routed through the network, one or more intermediate stations, such as routers, may update, that is, alter, one or more of the packet headers. Each of the intermediate stations that alters the packet headers accumulates the cells, or more specifically, data bytes included therein, and reassembles them into the respective data packets. Before altering the headers, the intermediate station performs an error detection operation, to determine if the received packet is error free. If the packet contains errors, the station typically refrains from altering the packet and from sending the packet to a next station. Otherwise, the station alters the packet and sends it on to the destination station.

Once an intermediate station alters a packet header, the station must necessarily update the error detection encoding, to prevent the altered information from being considered erroneous by the next station that performs error detection. Accordingly, the intermediate station must not only perform the data packet reassembly and error detection operations to check for errors, it must also re-do the packet error detection encoding. In known prior systems, re-doing the encoding requires encoding the entire altered packet.

An ATM adaptation layer (AAL) is responsible for segmenting the data packets into the cells at the source station and reassembling the cells into the packet at the intermediate station. One AAL, referred to as AAL 5, includes in the last cell of a data packet a multiple-bit CRC remainder, which is produced first at the source station by encoding the packet data bytes in accordance with a CRC code, and again at the intermediate stations after the updating of the packet. Using the AAL 5 protocol, each of the intermediate stations that alters a packet header determines if the received packet contains errors by encoding the received data bytes and the CRC remainder, in accordance with the CRC code, and comparing the result to a predetermined constant, or CRC pattern. If the two match, the station determines that the packet is error-free, and it then updates the packet. Conversely, if the two do not match, the station determines that the packet contains errors.

In known prior systems, each data packet is encoded at the source station by (i) selectively combining the first data byte of the packet with the contents of a register that has been set to an initial condition, (ii) using the result of the encoding to update the register, (iii) encoding a next byte by selectively combining it with the contents of the updated register, (iv) updating the register with the results of the encoding, and so forth, until all of the data bytes in the packet have been encoded. After the last data byte is encoded, the is complement of the contents of the register are appended to the packet as the CRC remainder, the packet is segmented into the fixed-sized cells, and the cells are transmitted ultimately to the designated destination station.

At an intermediate station that is to alter the packet by, for example, updating the packet header, the station typically first checks the received packet for errors using the packet CRC. The station thus completes steps i-iv, and then further encodes the packet CRC remainder. The station next compares the result of the encoding with a predetermined pattern. If the two match, the station determines that the packet is error-free. Next, the station alters the packet header. It then produces a new packet CRC remainder by completing steps i-iv using the altered packet and complementing the result. The station then replaces the CRC remainder in the packet with the new one. The intermediate station thus performs two complete and time consuming packet encoding operations in order to update the packet header.

SUMMARY OF THE INVENTION

The invention is an encoder for use in an intermediate station that produces a CRC reminder for an altered packet by determining the contributions that the altered bits make to the packet CRC remainder and then appropriately modifying the remainder. The station thus avoids having to re-encode the entire altered packet.

More specifically, the CRC encoder in the intermediate station XORs the altered packet with the received packet to produce a packet that has ones in the positions of the altered bits and zeros in the positions of unaltered bits. Typically, the intermediate station alters only the packet header, which is included in a single cell of the packet— and generally in the first cell of the packet. The encoder then encodes the result of the XOR operation in accordance with the CRC to produce a Δ-CRC value, and manipulates the Δ-CRC value to produce a Δ-CRC remainder that corresponds to the contributions the altered bits make to the packet CRC remainder.

The station next combines the packet CRC remainder with the Δ-CRC remainder, to produce a new CRC remainder that corresponds to the altered packet. The station then stores the new CRC remainder in the last cell of the packet, replacing the previously-stored CRC remainder. The station thus avoids having to re-encode the entire altered packet.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Section 1 discusses the encoding operations of a source station operating in accordance with AAL5. Section 2 discusses, in general terms the CRC verification and encoding operations performed by an intermediate station that is constructed in accordance with the current invention. Section 3 discusses the theory of the CRC verification and encoding operations performed by the intermediate station. Section 3 discusses, in terms of a specific example in AAL5, the CRC verification and encoding operations performed by the intermediate station.

1. Source Station Encoding

Figure 1:
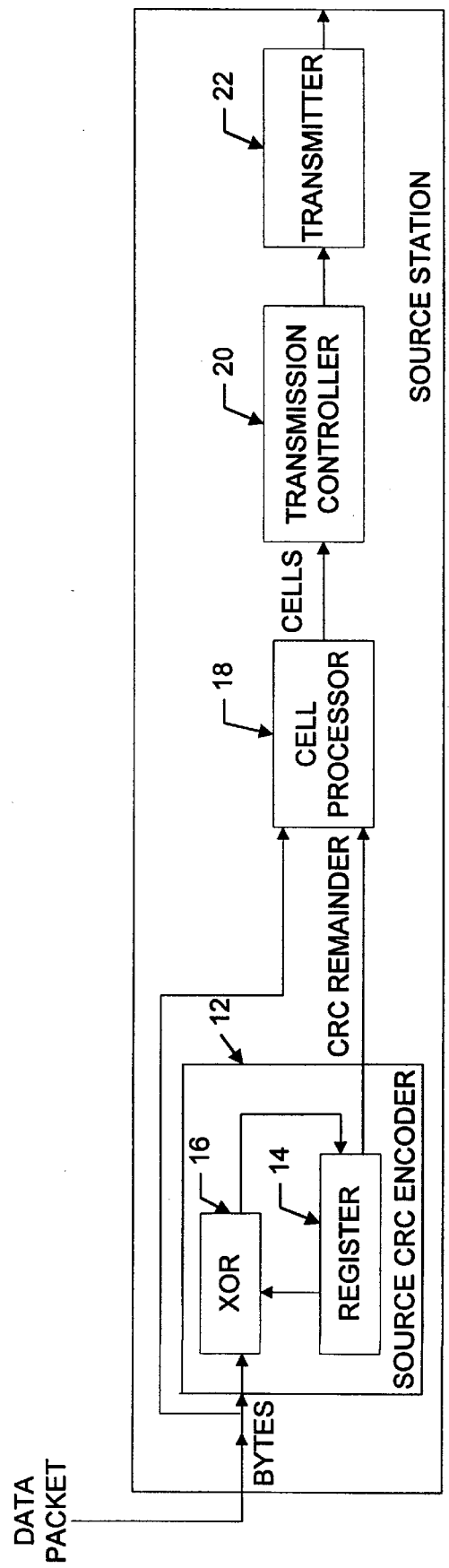
FIG. 1 is a functional block diagram of a source station.

Referring to FIG. 1, a source station 10 receiving data from, for example, a peripheral device (not shown), supplies a data packet to a CRC encoder 12. The CRC encoder 12, operating in a conventional manner, initializes, or sets, a "c"-bit checksum register 14 to a "seed" value, where c, which is the number of bits in the CRC remainder, equals 32 for AAL5. The encoder 12 then combines, that is, XOR's, the first data byte of the packet with the contents of a register 14, using XOR gates 16. The result of the encoding of the first data byte is then used to update the register 14. The first data byte is also provided to a cell processor 18. As in understood by those skilled in the art, the encoder may encode the data as bytes 16 or 32-bit words, or as other groupings of bits. For convenience, the encoding is discussed herein in terms of bytes.

The encoder 12 encodes the second data byte of the data packet in the same manner, by combining it with the contents of the updated register 14, and again updating the register 14 with the result. This data byte is similarly provided to the cell processor 18. The encoder repeats these encoding and updating operations with the next data byte, and so forth, until all the data bytes in the packet have been encoded. The contents of the register 14, are then supplied to the cell processor 18, as the packet CRC remainder, or checksum.

Figure 2:
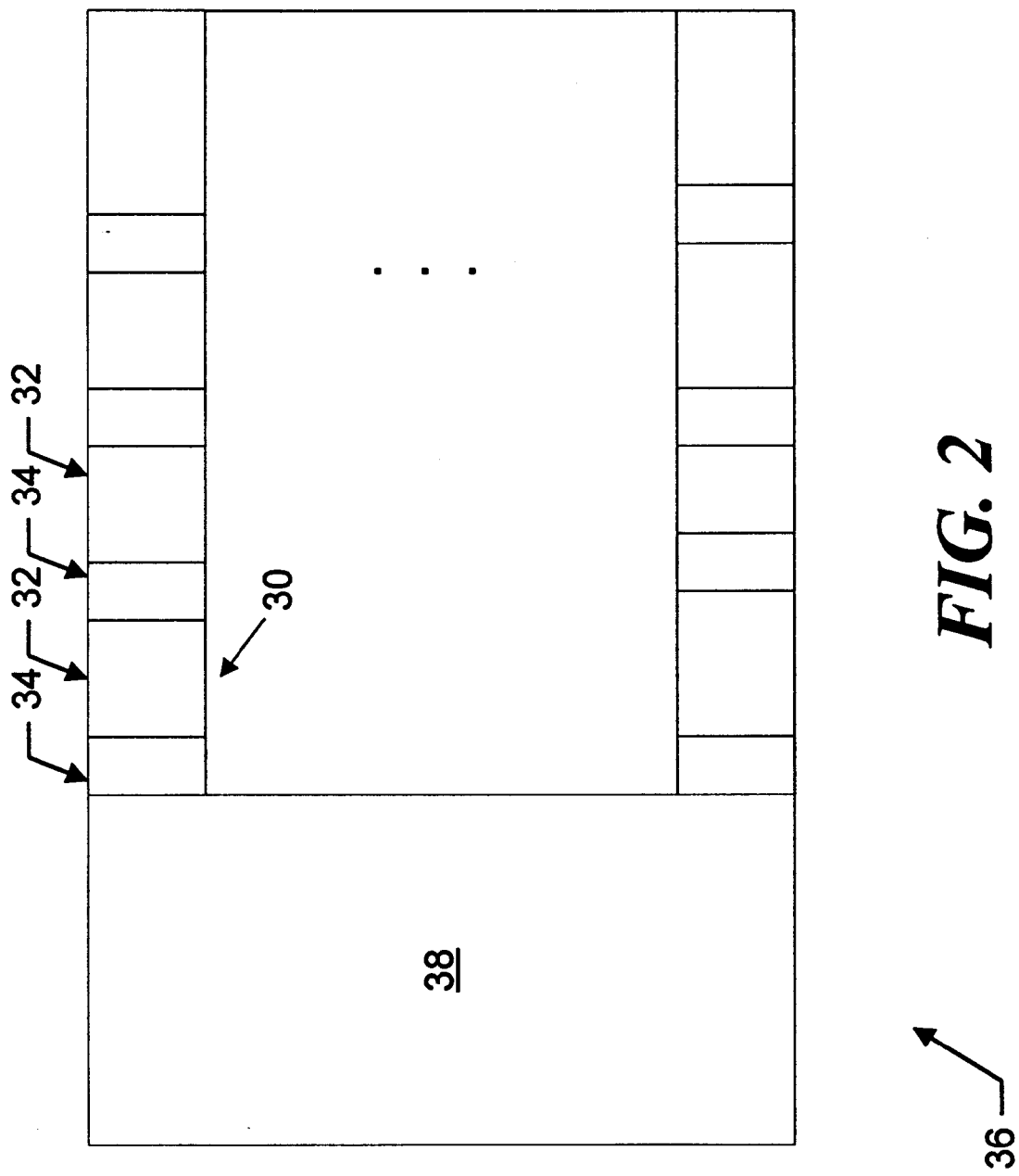
FIG. 2 is an illustration of a cell and a frame.

Referring also to FIG. 2, the cell processor 18 segments the data into cells 30. It first separates the data into groups of "n" bytes and appends to each group an appropriate b-byte cell header 34 that contains routing and other information, where in AAL5 n=48 and b=5. The processor 18 includes the 32-bit CRC remainder as the last 4 bytes of the last cell. As necessary, padding is included in one or more of the cells, to ensure that each cell has a payload 32 of 48 bytes. As previously discussed, the data bytes consist of data and the packet header(s), which are all treated in the same manner by the cell processor.

The cell processor 18 supplies the cells to a transmission controller 20, which controls the operations of a transmitter 22. The controller 20 and transmitter 22 transmit the cells over a network (not shown) through one or more intermediate stations 40 (FIG. 3), to a designated destination station (not shown).

2. Intermediate Station Encoding of Altered Packets

Figure 3:
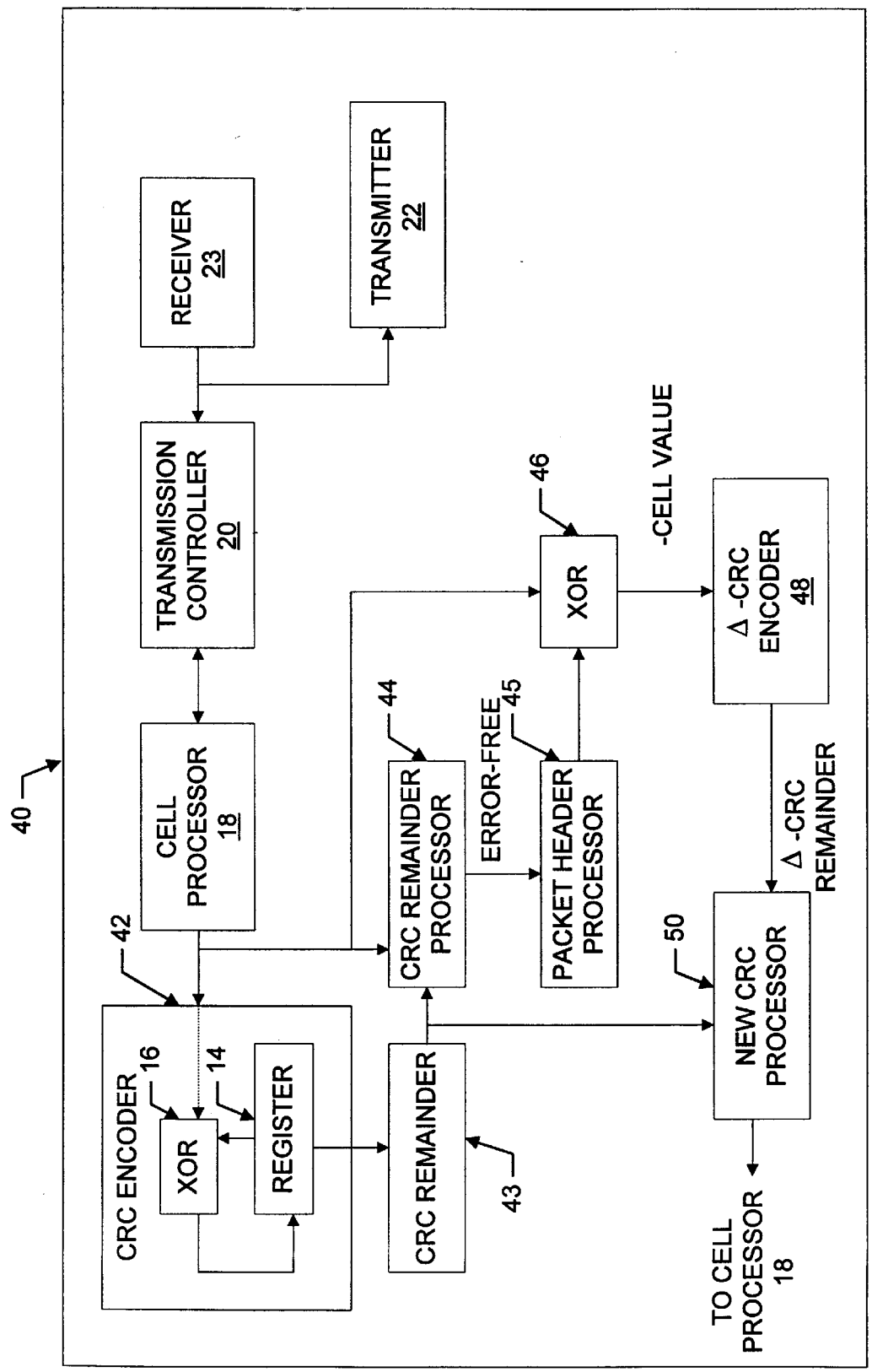
FIG. 3 is a functional block diagram of an intermediate station that is constructed in accordance with the invention.

Referring now to FIG. 3, an intermediate station 40 receives the cells from the network (not shown) through a receiver 23. The receiver supplies the cells to a transmission controller 20, which is commonly referred to as transmission convergence logic. The controller 20, in turn, supplies the cells to the cell processor 18, and the cell processor 18 supplies the data bytes included therein to a CRC encoder 42, along with a VPI/VCI that indicates to the encoder the packets to which the cells belong.

The CRC encoder 42, which operates in essentially the same manner as the source CRC encoder 12, encodes the data bytes and the packet CRC remainder associated with a particular packet in accordance with the CRC code to produce a CRC pattern for the packet. The CRC pattern is then held in register 43. The station next determines, in CRC remainder processor 44 if the CRC pattern in the register 43 is the same as a predetermined CRC pattern. If the two match, the intermediate station determines that the packet has been correctly received. It then alters the packet, as appropriate. As is understood by those skilled in the art, the intermediate station simultaneously processes many packets, determining for each an associated CRC pattern. The encoding operations are discussed in more detail with reference to FIG. 3.

An intermediate station that alters a packet typically alters only the packet header. The packet header is generally contained in a single cell, and usually the first cell of the packet. Accordingly, the operations of the encoder in producing a CRC remainder for an altered packet are described with reference to the altering of the first cell of the packet. The operations are then generalized, and made applicable to packets that have any one or more of their cells altered.

A packet header processor 45 produces a new, or updated, packet header and, in XOR gates 46, XOR's the new packet header with the old packet header. The XOR gates 46 produce a Δ-cell value that has a zero in each position in which the bits in the old packet header and the new packet header are the same and a non-zero value in each bit position in which the two headers differ, that is, in the bit positions that correspond to the bits that have been changed.

A Δ-CRC encoder 48 encodes the Δ-cell value in accordance with the CRC to produce a Δ-CRC value. The encoder 48 then further encodes the Δ-CRC value a number of times that corresponds to the number of cells that follow the altered cell. In the example, the first cell of an n-cell packet is the one that is altered, and the Δ-CRC encoder 48 encodes the associated Δ-CRC value n−1 times, once for each succeeding cell. The result is a Δ-CRC remainder that corresponds to the changes, that the altered bits make to the packet CRC remainder. If more than one cell is altered, the Δ-CRC encoder includes in the encoding operations at the appropriate iterations the Δ-CRC values associated with various altered cells. If, for example, cell n−5 is also altered, the corresponding Δ-CRC value is included in the encoding after the n−$6^{th}$ iteration, as discussed below with reference to FIG. 4.

An update CRC processor 50 combines the packet CRC remainder and the Δ-CRC remainder, to produce a new CRC remainder that corresponds to the altered packet. The station includes the new CRC remainder as the last 4 bytes of the last cell of the altered packet, and thus, replaces the CRC remainder previously contained therein. The station then in a conventional manner segments the packet, in cell processor 18. The processor 18 delivers the cells to the transmission controller 20, which controls the transmitter 22. The controller 20 and the transmitter 22 then transmit the cells along the designated route.

3. Δ-CRC Encoding

In conventional prior systems, the CRC verification of a received packet is performed by encoding the entire packet to produce a CRC remainder, R(x), in accordance with the following expression:

$$R(x) = (x^i L(x) + x^c F(x)) \bmod G(x) \quad [1]$$

where i is the length of the packet in bits, L(x) is the seed value that is used to initialize the CRC register, c is the number of bits in the CRC remainder, F(x) is a polynomial of order $x^{i-1}$ with coefficients that are is equal to the bits of the packet—modulo 2, and G(x) is the CRC generator polynomial. The terms $x^d$ are displacement values. For example, $x^i$ displaces the seed value, L(x), such that it is combined with the first data byte of the packet.

In cell-based systems, the packet is received as n cells, and $$F(x) = \sum_{k=0}^{n-1} x^{ak} f_k(x) \quad [2]$$

where a is the length of the data in a cell in bits, $f_k(x)$ is a polynomial of order $x^{a-1}$ with coefficients that are equal to the bits of a cell—modulo 2, and n is the number of cells in the packet. Substituting into formula 1, the CRC remainder for a full packet of n cells is:

$$R(x) = \left( x^{an} L(x) + \sum_{k=0}^{n-1} x^{ak+c} f_k(x) \right) \bmod G(x) \quad [3]$$

As discussed in a co-pending patent application Ser. No. 08/535,453, entitled ENCODER FOR USE IN ASYNCHRONOUS TRANSFER MODE SYSTEMS, which is assigned to a common assignee, a "partial CRC remainder" can be determined for each cell by encoding the bits of the cell as if they were the bits of the entire packet. Thus, by definition, the partial CRC remainder, $r_k(x)$, for each cell is:

$$r_k(x) = H(f_k(x)) = x^c f_k(x) \bmod G(x) \quad [4]$$

Note that this is the same as formula 1, with a seed value of $L(x)=0$. Substituting into equation 3, $$R(x) = \left( x^{an} L(x) + \sum_{k=0}^{n-1} x^{ak} r_k(x) \right) \bmod G(x). \quad [5]$$

By defining an expression T(x) as $$T(x) = x^{a-c} \bmod G(x)$$

where c is again the number of bits in the CRC remainder, and substituting this into equation 4, $$R(x) = \left[ T(x)^n x^{cn} L(x) + \sum_{k=0}^{n-1} T(x)^k x^{ck} r_k(x) \right] \bmod G(x) \quad [6]$$

and R(x) can be reconstructed from partial CRC remainders $r_k(x)$, determined for each cell by initializing the CRC register to $R(x)=L(x)$ and determining for k=1 to n−1:

$$R(x) = H(T(x)R(x)) * r_k(x) \quad [7]$$

where "*" again represents XOR'ing.

Now, if the data packet, F(x), is altered, $F(x)=P(x)+Q(x)$, where P(x) has coefficients associated with the received data packet and Q(x) has coefficients that are equal to the bits of the Δ-cell value, that is, has coefficients that correspond to the changes made to the received packet. The coefficients of Q(x) are thus the results of the XOR'ing of the received packet and the altered packet. As discussed above, the Δ-cell value has zeros in the positions of the bits that are unchanged between the packets, and thus, Q(x) has zeros as the corresponding coefficients. Further, Q(x) has non-zero coefficients that correspond to the changed bits.

Using Equation 1, the packet CRC remainder, $R_F(X)$, for the altered packet is:

$$R_F(x) = ((x^j L(x) + x^c (P(x) + Q(x)) \bmod G(x)$$

and thus $$R_F(x) = ((x^j L(x) + x^c (P(x)) \bmod G(x) + (x^c Q(x)) \bmod G(x)$$

The first term of this equation is the packet CRC remainder, $R_P(x)$, that corresponds to the received packet. Accordingly, $$R_F(x) = R_P(x) + (x^c Q(x)) \bmod G(x).$$

The second term is the CRC remainder, $R_Q(x)$, attributable to Q(x) with $L(x)=0$. $R_Q(x)$ can be determined from the Δ-CRC values by setting $R_Q(x)=0$ and, for $n-1 \geq k \geq 0$:

$$R_Q(x) = H(T(x)R_Q(x)) * r_k$$

where * represents XOR'ing and $r_k$ is the Δ-CRC value determined for the $k^{th}$ cell of Q(x). If only the first cell is updated, i.e., only the packet header is updated, $R_Q(x)$ can be determined by setting $R_{Q0}(x) = r_{n-1}$ r1 and for $1 < k \leq n-1$:

$$R_{QK}(x) = H(T(x)R_{QK-1}(x)) \quad [8]$$

since $r_k$ is zero for all but the first cell of Q(x).

T(x) is a constant, and thus, the expression H(T(x)R(x)) in equation 8 readily reduces, in a station performing the calculations using the CRC of AAL5, to a set of bit equations set forth in Table 2 below.

$R_Q(x)$ is then combined with $R_P(x)$ to produce the new packet CRC remainder, $R_F(x)$.

The encoding of the Δ-CRC value in this manner eliminates the need to re-encode the entire altered packet, as is done in prior systems.

4. Encoding Using a Δ-CRC Remainder—In AAL5

Referring again to FIG. 1, a source station 10 in a conventional manner encodes the data bytes of a data packet in accordance with the polynomial $$x^{32} + x^{26} + x^{23} + x^{22} + x^{16} + x^{12} + x^{11} + x^{10} + x^8 + x^7 + x^5 + x^4 + x^2 + x^1 + 1$$

to produce a 32-bit packet CRC remainder. To start the encoding, the register 14, which is a 32-bit register, is initialized to all ones, or in hexadecimal notation to a value of FFFFFFFF. The contents of the register 14 are hereinafter denoted R[31:0], with the numerals in brackets representing the individual bits.

The encoder 12 encodes the first data byte $D_1[7:01]$ by combining it with, that is, XOR'ing it to, R[31:23], to produce a checksum byte B[7:0]. It then combines this checksum byte with the contents of the register to produce an update checksum U[31:0] in accordance with the following table, in which "*" represents XOR'ing:

TABLE 1

U[31] = B[5] * R[23]
U[30] = B[7] * B[4] * R[22]
U[29] = B[7] * B[6] * B[3] * R[21]
U[28] = B[6] * B[5] * B[2] * R[20]
U[27] = B[7] * B[5] * B[4] * B[1] * R[19]
U[26] = B[6] * B[4] * B[3] * B[0] * R[18]
U[25] = B[3] * B[2] * R[17]
U[24] = B[7] * B[2] * B[1] * R[16]
U[23] = B[6] * B[1] * B[0] * R[15]
U[22] = B[0] * R[14]
U[21] = B[5] * R[13]

TABLE 1-continued

```
U[20] = B[4] * R[121
U[19] = B[7] * B[3] * R[11]
U[18] = B[7] * B[6] * B[2] * R[10]
U[17] = B[6] * B[5] * B[1] * R[9]
U[16] = B[5] * B[4] * B[0] * R[8]
U[15] = B[7] * B[5] * B[4] * B[3] * R[7]
U[14] = B[7] * B[6] * B[4] * B[3] * B[2] * R[6]
U[13] = B[7] * B[6] * B[5] * B[3] * B[2] * B[1] * R[5]
U[12] = B[6] * B[5] * B[4] * B[2] * B[1] * B[0] * R[4]
U[11] = B[4] * B[3] * B[1] * B[0] * R[3]
U[10] = B[5] * B[3] * B[2] * B[0] * R[2]
U[9] = B[5] * B[4] * B[2] * B[1] * R[1]
U[8] = B[4] * B[3] * B[1] * B[0] * R[0]
U[7] = B[7] * B[5] * B[3] * B[2] * B[0]
U[6] = B[7] * B[6] * B[5] * B[4] * B[2] * B[1]
U[5] = B[7] * B[6] * B[5] * B[4] * B[3] * B[1] * B[0]
U[4] = B[6] * B[4] * B[3] * B[2] * B[0]
U[3] = B[7] * B[3] * B[2] * B[1]
U[2] = B[7] * B[6] * B[2] * B[1] * B[0]
U[1] = B[7] * B[6] * B[1] * B[0]
U[0] = B[6] * B[0]
```

The update checksum U[31:0] is then used to update the register 14 to R[31:0]=U[31:0] before the second data byte is encoded.

The encoder next combines the second data byte $D_2[7:0]$ with R[31:24] to produce an associated checksum byte B[7:0] and this byte is combined with the contents of the register 14 in accordance with Table 1 above. The register 14 is again updated with the update checksum U[31:0] produced by this encoding, and a next data byte $D_i$ is encoded in the same manner until all the data bytes in the packet have been encoded and a last update checksum $U_L[31:0]$ has been produced. This last checksum is supplied to the cell processor 18 as the packet CRC remainder.

The cell processor 18 groups the data into 48-byte segments and appends to each segment a 5-byte header, to form a plurality of cells. These cells are then transmitted to the destination station.

Referring now to FIG. 3, the intermediate station receives the cells, each of which contain a portion of the data bytes associated with a particular data packet. The station applies the cells to the CRC encoder 42 through the cell processor 18, which provides to the encoder the data bytes and a VPI/VCI that indicates the packets to which the cells belong. The CRC encoder encodes the data bytes, to produce for each of the packets an associated CRC pattern for the packet.

To produce the CRC pattern for the packet, the intermediate station either encodes the cells associated with a packet in a conventional manner, as is done in the source station, or individually encodes the cells to produce for each an associated partial CRC remainder. The partial CRC remainders associated with the cells of a packet are later further encoded to form the packet CRC remainder, as discussed in the co-pending U.S. Pat. application Ser. No. 08/535,453 of U.S. Pat. No. 5,691,997 entitled ENCODER FOR USE IN ASYNCHRONOUS TRANSFER MODE SYSTEMS, which is incorporated herein by reference.

After the packet CRC pattern for the packet has been calculated, the CRC pattern for the packet processor 44 determines if the calculated CRC remainder is the same as a predetermined pattern. If so, the station determines that the packet is error-free. The station next produces the altered cells. In the example, the header processor 44 produces a new packet header, which is typically contained in the first few bytes of the first cell of the packet. The header processor 44 then combines the new header with the old header in XOR gates 46, to produce the corresponding Δ-header value.

Figure 4:
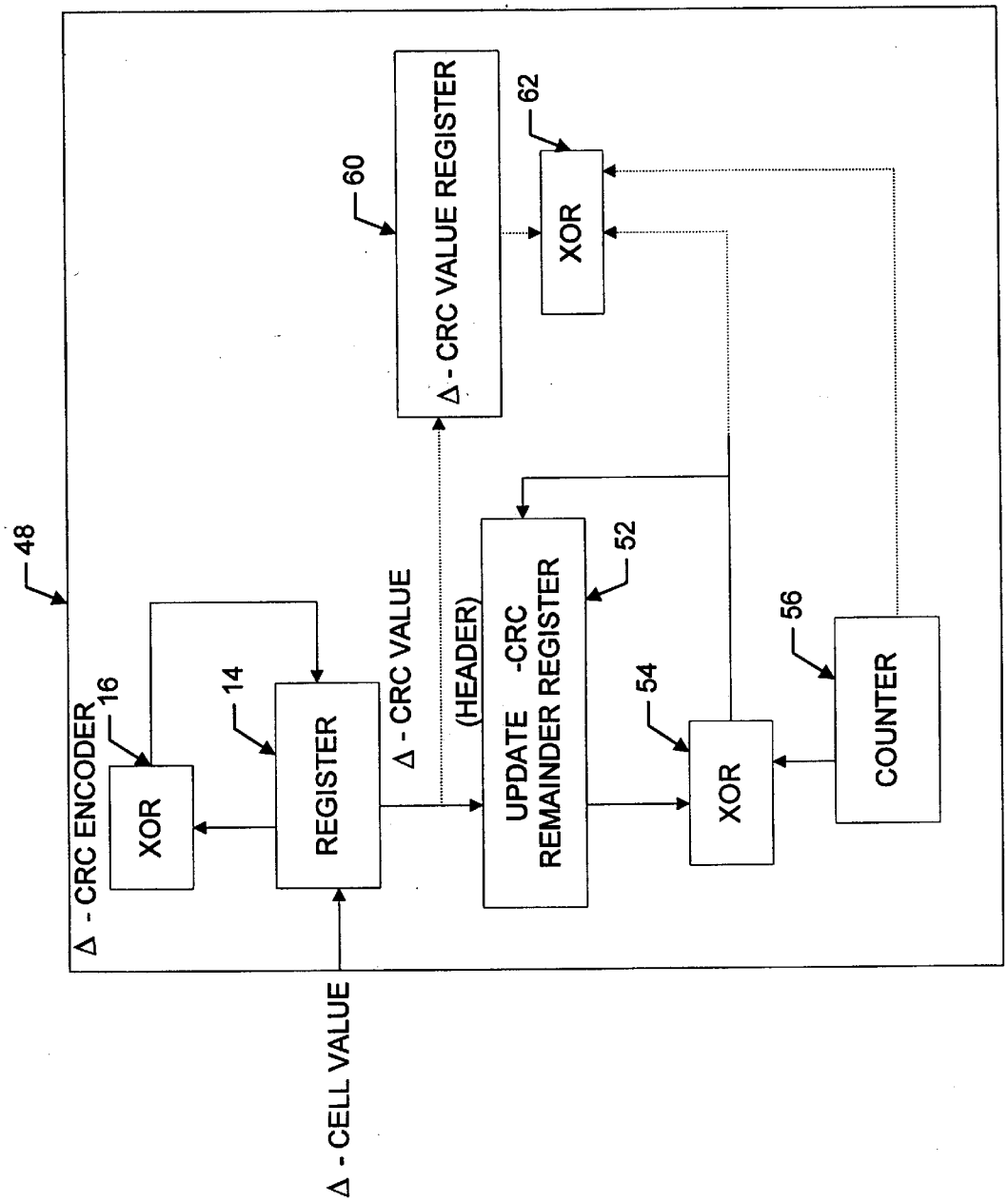
FIG. 4 is a functional block diagram of an encoder that is included in the intermediate station of FIG. 3.

Referring now also to FIG. 4, the Δ-header value is next encoded in the Δ-CRC encoder 48. A seed value, L(x)=0, is used to initialize the register 14 and the Δ-header value is encoded as if it is the first cell of a packet, to produce a Δ-CRC value. The Δ-CRC value is then "displaced," or manipulated, in the Δ-CRC encoder, to produce a Δ-CRC remainder that corresponds to the changes that the altered bits make to the packet CRC remainder. If the first cell is altered, the corresponding Δ-CRC value is manipulated to correspond to the displacing of the Δ-CRC value appropriately for the n−1 succeeding cells. Since the packet CRC remainder is included in the last four bytes of the last cell, the encoder 48 compensates for the inclusion of only 44 data bytes in that cell either by manipulating the Δ-CRC value differently for the last cell of the packet or, preferably, by calculating the Δ-CRC value for the first cell as if it contained only 44 data bytes. Using this second method the encoder manipulates the Δ-CRC value in an identical manner for each of the succeeding cells.

In the example, in which only the header is altered at the intermediate station, the Δ-CRC encoder 48 uses the Δ-CRC value as the initial contents of a Δ-CRC remainder register 52. It then manipulates the bits of the register 52 in XOR gates 54 in accordance with the expressions in Table 2 below:

TABLE 2

```
DCRC[31] = UP[28]*UP[25]*UP[23]*UP[21]*UP[19]*UP[16]*UP[15]
           *UP[13]*UP[10]*UP[9]*UP[6]*UP[5]*UP[4]*UP[0];
DCRC[30] = UP[27]*UP[24]*UP[22]*UP[20]*UP[18]*UP[15]*UP[14]
           *UP[12]*UP[9]*UP[8]*UP[5]*UP[4]*UP[3];
DCRC[29] = UP[31]*UP[26]*UP[23]*UP[21]*UP[19]*UP[17]*UP[14]
           *UP[13]*UP[11]*UP[8]*UP[7]*UP[4]*UP[3]*UP[2];
DCRC[28] = UP[31]*UP[30]*UP[25]*UP[22]*UP[20]*UP[18]*UP[16]
           *UP[13]*UP[12]*UP[10]*UP[7]*UP[6]*UP[3]*UP[2]*UP[1];
DCRC[27] = UP[31]*UP[30]*UP[29]*UP[24]*UP[21]*UP[19]*UP[17]
           *UP[15]*UP[12]*UP[1 1]*UP[9]*UP[6]*UP[5]*UP[2]*UP[1]*UP[0];
DCRC[26] = UP[30]*UP[29]*UP[28]*UP[23]*UP[20]*UP[18]*UP[16]
           *UP[14]*UP[11]*UP[10]*UP[8]*UP[5]*UP[4]*UP[1]*UP[0];
DCRC[25] = UP[31]*UP[29]*UP[27]*UP[25]*UP[23]*UP[22]*UP[21]
           *UP[17]*UP[16]*UP[7]*UP[6]*UP[5]*UP[3];
DCRC[24] = UP[31]*UP[30]*UP[28]*UP[26]*UP[24]*UP[22]* UP[21]
           *UP[20]*UP[16]*UP[15]*UP[6]*UP[5]*UP[4]*UP[2];
DCRC[23] = UP[30]*UP[29]*UP[27]*UP[25]*UP[23]*UP[21]*UP[20]
           *UP[19]*UP[15]*UP[14]*UP[5]*UP[4]*UP[3]*UP[1];
DCRC[22] = UP[29]*UP[26]*UP[25]*UP[24]*UP[23]*UP[22]*UP[21]
           *UP[20]*UP[18]*UP[16]*UP[15]*UP[14]*UP[10]*UP[9]*UP[6]
           *UP[5]*UP[3]*UP[2];
```

TABLE 2-continued

```
DCRC[21] =  UP[31]*UP[24]*UP[22]*UP[20]*UP[17]*UP[16]*UP[14]
            *UP[10]*UP[8]*UP[6]*UP[2]*UP[1]*UP[0];
DCRC[20] =  UP[31]*UP[30]*UP[23]*UP[21]*UP[19]*UP[16]*UP[15]
            *UP[13]*UP[9]*UP[7]*UP[5]*UP[1]*UP[0];
DCRC[19] =  UP[30]*UP[29]*UP[22]*UP[20]*UP[18]*UP[15]*UP[14]
            *UP[12]*UP[8]*UP[6]*UP[4]*UP[0];
DCRC[18] =  UP[31]*UP[29]*UP[28]*UP[21]*UP[19]*UP[17]*UP[14]
            *UP[13]*UP[11]*UP[7]*UP[5]*UP[3];
DCRC[17] =  UP[31]*UP[30]*UP[28]*UP[27]*UP[20]*UP[18]*UP[16]
            *UP[13]*UP[12]*UP[10]*UP[6]*UP[4]*UP[2];
DCRC[16] =  UP[31]*UP[30]*UP[29]*UP[27]*UP[26]*UP[19]*UP[17]
            *UP[15]*UP[12]*UP[11]*UP[9]*UP[5]*UP[3]*UP[1];
DCRC[15] =  UP[31]*UP[30]*UP[29]*UP[26]*UP[23]*UP[21]*UP[19]*UP[18]
            *UP[15]*UP[14]*UP[13]*UP[11]*UP[9]*UP[8]*UP[6]*UP[5]*UP[2];
DCRC[14] =  UP[30]*UP[29]*UP[28]*UP[25]*UP[22]*UP[20]*UP[18]* UP[17]
            *UP[14]*UP[13]*UP[12]*UP[10]*UP[8]*UP[7]*UP[5]*UP[4]*UP[1];
DCRC[13] =  UP[29]*UP[28]*UP[27]*UP[24]*UP[21]*UP[19]*UP[17]
            *UP[16]*UP[13]*UP[12]*UP[11]*UP[9]*UP[7]*UP[6]*UP[4]*UP[3]*UP[0];
DCRC[12] =  UP[28]*UP[27]*UP[26]*UP[23]*UP[20]*UP[18]* UP[16]
            *UP[15]*UP[12]*UP[11]*UP[10]*UP[8]*UP[6]*UP[5]*UP[3]*UP[2];
DCRC[11] =  UP[31]*UP[28]*UP[27]*UP[26]*UP[23]*UP[22]*UP[21]
            *UP[17]*UP[16]*UP[14]*UP[13]*UP[11]*UP[7]*UP[6]*UP[2]*UP[1]*UP[0];
DCRC[10] =  UP[31]*UP[30]*UP[28]*UP[27]*UP[26]*UP[23]*UP[22]
            *UP[20]*UP[19]*UP[12]*UP[9]*UP[4]*UP[1];
DCRC[9] =   UP[30]*UP[29]*UP[28]*UP[27]*UP[26]*UP[23]*UP[22]*UP[18]
            *UP[16]*UP[15]*UP[13]*UP[11]*UP[10]*UP[9]*UP[8]* UP[6]*UP[5]
            *UP[4]*UP[3];
DCRC[8] =   UP[31]*UP[29]*UP[28]*UP[27]*UP[26]*UP[25]*UP[22]*UP[21]*UP[17]
            *UP[15]*UP[14]*UP[12]*UP[10]*UP[9]*UP[8]*UP[7]*UP[5]*UP[4]
            *UP[3]*UP[2];
DCRC[7] =   UP[31]*UP[30]*UP[27]*UP[26]*UP[z4]*UP[23]*UP[20]*UP[19]
            *UP[15]*UP[14]*UP[11]*UP[10]*UP[8]*UP[7]*UP[5]*UP[3]*UP[2]
            *UP[1]*UP[0];
DCRC[6] =   UP[30]*UP[29]*UP[28]*UP[26]*UP[22]*UP[21]*UP[18]*UP[16]
            *UP[15]*UP[14]*UP[7]*UP[5]*UP[2]*UP[1];
DCRC[5] =   UP[31]*UP[29]*UP[28]*UP[27]*UP[25]*UP[24]*UP[21]*UP[20]*UP[17]
            *UP[15]*UP[14]*UP[13]*UP[6]*UP[4]*UP[1]*UP[0];
DCRC[4] =   UP[31]*UP[30]*UP[27]*UP[26]*UP[25]*UP[24]*UP[23]*UP[21]
            *UP[20]*UP[15]*UP[14]*UP[12]*UP[10]*UP[9]*UP[6]*UP[4]*UP[3];
DCRC[3] =   UP[31]*UP[30]*UP[29]*UP[28]*UP[26]*UP[24]*UP[22]*UP[21]*UP[20]
            *UP[16]*UP[15]*UP[14]*UP[1 1]*UP[10]*UP[8]*UP[6]*UP[4]*UP[3]
            *UP[2]*UP[0];
DCRC[2] =   UP[31]*UP[30]*UP[29]*UP[28]*UP[27]*UP[25]*UP[23]*UP[21]*UP[20]
            *UP[19]*UP[15]*UP[14]*UP[13]*UP[10]*UP[9]*UP[7]*UP[5]*UP[3]
            *UP[2]*UP[1];
DCRC[1] =   UP[30]*UP[29]*UP[27]*UP[26]*UP[25]*UP[24]*UP[23]*UP[22]*UP[21]
            *UP[20]*UP[18]*UP[16]*UP[15]*UP[14]*UP[12]*UP[10]*UP[8]*UP[5]
            *UP[2]*UP[1];
DCRC[0] =   UP[29]*UP[26]*UP[24]*UP[22]*UP[20]*UP[17]*UP[16]*UP[14]
            *UP[11]*UP[10]*UP[7]*UP[6]*UP[5]*UP[1].
``` where UP[ ] denotes the contents of the Δ-CRC remainder register 52, "*" denotes XOR'ing and DCRC[ ] denotes the result of the XOR'ing that are fed back to the Δ-CRC remainder register 52.

The encoder feeds the bits from the Δ-CRC register to the XOR gates 54 once for each succeeding cell of the packet under the control of an iteration counter 56, which has counted the number of cells encoded in the encoder 42. Thus, for a packet with n cells in which the first cell of the packet is altered, the contents of the register 52 are fed to the XOR gates 54 n−1 successive times.

At the end of the encoding the register 52 contains the Δ-CRC remainder. The update CRC processor 50 then adds this remainder to the packet CRC remainder, which is contained in CRC remainder register 43, to produce a new packet CRC remainder that corresponds to the altered packet.

Appendix A contains a numerical example involving a 221-byte data packet with changes being made to the header, that is, to only the first cell of the packet.

If more than one cell has been altered, the Δ-CRC encoder 48 incorporates at the appropriate iterations additional Δ-CRC values that correspond, respectively, to the altered cells. If, for example, cell n−5 is also altered, the encoder includes in its operations the Δ-CRC value calculated for that cell—after the iterations associated with cells n−1, n−2, n−3 and n−4 have been completed.

The encoder 48 thus includes a Δ-CRC value register 60 and XOR gates 62 that under the control of the counter 56 XORs the contents of the register 60 with the results, that is, the update value, produced by XOR gates 54, before the update value is fed back to the register 52. The most significant bit in the register 60 is XOR'd with the most significant bit of the update value produced by the XOR gates 54, the next most significant bit of the register 60 is XOR'd with the next most significant bit of the updated value and so forth. The update expression for the most significant bit is thus:

DCRC[31] = DCV[31] * UP[28] * UP[25] * UP[23] * UP[21] * UP[19] *
          UP[16] * UP[15] * UP[13] * UP[10] * UP[9] * UP[6] * UP[5] *
          UP[4] * UP[0]

where DCV[31] is the most significant bit of the Δ-CRC value associated with the altered cell. The DCV bit values are then used to update the Δ-CRC remainder register 52.

If additional cells are altered at the intermediate station, the station similarly encodes each of the Δ-cell values, that is, the values produced by XOR'ing the altered cells and the corresponding received cells to produce the corresponding Δ-CRC values. These Δ-CRC values are then included in the encoding at the appropriate iterations.

The exemplary embodiment is described in terms of AAL5 protocol in which cells arrive at a destination station in order. With known prior encoding systems, the in-order delivery is essential to the CRC remainder calculations, since they accumulate the CRC remainder over the entire data packet. In the current system, which encodes each cell individually, the order of arrival of the cells is not critical, as long as the cells can be reassembled in the proper order, such reassembly ensures that the partial CRC remainders will also be in order. Thus the current system can, without modification, be used in connectionless networks.

Various encoders and update encoders, processors and so forth are depicted as separate components, but may be combined. Further, certain operations depicted serially may instead be performed in parallel. In particular, components can be arranged such that intermediate storage of the packets remains in cells, and the packets thus need not be reassembled. Further, the invention may be used by stations that do not, in particular applications, check the received packet for errors before altering the packet header. In such stations, the packet header is altered, the Δ-CRC value determined and the CRC updated, as discussed above.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A system for producing cyclic redundancy check "CRC" remainders for altered data packets that are produced by substituting one or more altered cells for corresponding received cells in received data packets that contain CRC remainders, the system including:
   A. a CRC encoder that encodes in accordance with a CRC code, the CRC encoder producing an associated Δ-CRC value for each of the altered cells by encoding for each of the altered cells a Δ-cell value, which is a bit pattern produced by exclusive-OR'ing the altered cell and the corresponding received cell;
   B. a Δ-CRC encoder for encoding the Δ-CRC values to produce a Δ-CRC remainder that corresponds to the changes that the altered cells make to the CRC contained in the received data packet;
   C. means for combining the Δ-CRC remainder produced by the Δ-CRC encoder and the CRC remainder contained in the received packet, to produce the CRC remainder for the altered data packet.

2. The system of claim 1, wherein the Δ-CRC encoder manipulates the Δ-CRC values in accordance with Table 2, in which UP[ ] denotes the contents of a register included in the Δ-CRC encoder that contains the results of manipulating the Δ-CRC values, and "*" denotes XOR'ing.

3. The system of claim 1, wherein the Δ-CRC encoder iteratively encodes the respective Δ-CRC values by a number of iterations that corresponds to the number of cells that follow the associated altered cells in the altered packet.

4. The system of claim 3, wherein the CRC encoder produces the Δ-CRC values by encoding the bit pattern associated with a given altered cell as if the bit pattern included a number of bytes that corresponds to the number of data bytes in the cell in the received packet that contains the CRC remainder.

5. The system of claim 1, wherein the system further includes means for determining if the received packet is error-free, the means encoding the received packet in accordance with the CRC code to produce a CRC pattern and comparing the CRC pattern with a predetermined pattern.

6. The system of claim 1 wherein the Δ-CRC encoder produces the Δ-CRC remainder by encoding the Δ-CRC values in accordance with the relative positions of the corresponding altered cells in the altered data packet.

7. A system for producing a CRC remainder for an altered data packet that consists of multiple cells of a received data packet and one or more altered cells that are substituted for cells of the received data packet, the system including:
   A. a CRC encoder for producing a Δ-CRC value for each altered cell, the encoder encoding in accordance with a CRC code a bit pattern that is a result of exclusive-OR'ing the altered cell and the corresponding cell of the received packet;
   B. a Δ-CRC encoder for manipulating the Δ-CRC values to produce a Δ-CRC remainder that corresponds to the differences between the corresponding cells of the received packet and the altered packet; and
   C. means for combining the Δ-CRC remainder and a CRC remainder from the received packet to produce a CRC remainder for the altered data packet.

8. The system of claim 7, wherein the Δ-CRC encoder manipulates the Δ-CRC values in accordance with Table 2, in which UP[ ] denotes the contents of a register included in the encoder, the register containing the results of manipulating the Δ-CRC values, and "*" denotes XOR'ing.

9. The system of claim 7, wherein the CRC encoder produces the respective Δ-CRC values by encoding the bit pattern associated with a given altered cell, as if the bit pattern included a number of bytes that corresponds to the number of data bytes in the cell in the received packet that contains the CRC remainder.

10. The system of claim 7, wherein the system further includes means for determining if a received data packet is error-free.

11. The system of claim 10, wherein the means for determining if a received data packet is error-free encodes the data bytes and CRC remainder included in the received packet in accordance with the CRC code to produce a CRC pattern and compares the CRC pattern to a predetermined CRC pattern.

12. A method for producing cyclic redundancy check "CRC" remainders for altered packets that include a plurality of received cells from a received packet and one or more altered cells that are substituted for corresponding received cells, the method including the steps of:

A. producing a Δ-CRC value for each altered cell by encoding in accordance with a CRC code a bit pattern that is the result of exclusive-OR'ing the-altered cell and the corresponding received cell;

B. manipulating the Δ-CRC values to produce a Δ-CRC remainder;

C. combining the Δ-CRC remainder and a CRC remainder included in the received packet to produce a CRC remainder for the altered packet.

13. The method of claim 12, wherein the step of manipulating the Δ-CRC values includes manipulating the Δ-CRC values in accordance with Table 2.

14. The method of claim 12, wherein the step of manipulating the Δ-CRC values includes manipulating the Δ-CRC values in accordance with the relative positions of the corresponding altered cells in the altered packet.

15. The method of claim 14, wherein the step of manipulating the Δ-CRC values includes iteratively manipulating the Δ-CRC values by numbers of iterations that correspond to the number of cells that follow the respective altered cells in the altered packet.

16. The method of claim 12, wherein the step of producing the Δ-CRC values includes encoding the respective bit patterns as if the bit patterns include a number of bytes that corresponds to the number of data bytes in the received cell that contains the CRC remainder.

17. The method of claim 12 further including the step of determining if the received packet in error-free by encoding the received cells in accordance with the CRC code to produce a CRC pattern and comparing the CRC pattern with a predetermined CRC pattern.

* * * * *

UNITED STATES PATENT AND TRADEMARK OFFICE
CERTIFICATE OF CORRECTION

PATENT NO. : 6,038,694　　　　　　　　　　　　　　　　　　　　　　　Page 1 of 1
DATED : March 14, 2000
INVENTOR(S) : George Swallow It is certified that error appears in the above-identified patent and that said Letters Patent is hereby corrected as shown below:

<u>Title page,</u>
Add in line [73]: Cisco Technology Inc., San Jose California

Signed and Sealed this

Twenty-first Day of August, 2001

*Attest:*

*Nicholas P. Godici*

*Attesting Officer*　　　　NICHOLAS P. GODICI
　　　　　　　　　　　　　*Acting Director of the United States Patent and Trademark Office*